United States Patent
Kanzaki et al.

(10) Patent No.: US 6,463,551 B1
(45) Date of Patent: Oct. 8, 2002

(54) DEBUG CIRCUIT AND MICROCOMPUTER INCORPORATING DEBUG CIRCUIT

(75) Inventors: Teruaki Kanzaki, Tokyo (JP); Sakae Itoh, Tokyo (JP); Tatsuya Sakai, Kanagawa (JP); Hiroshi Uchiike, Kanagawa (JP)

(73) Assignees: International Business Machines Corporation, Armonk, NY (US); Mitsubishi Electric System LSI Design Corporation, Itami (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/294,386

(22) Filed: Apr. 20, 1999

(30) Foreign Application Priority Data

Nov. 18, 1998 (JP) ............................. 10-328315

(51) Int. Cl.[7] ................................. G06F 11/00
(52) U.S. Cl. ............................. 714/30; 703/28
(58) Field of Search ..................... 714/30, 733, 734; 703/28

(56) References Cited

U.S. PATENT DOCUMENTS

| | | | | |
|---|---|---|---|---|
| 5,513,338 | * | 4/1996 | Alexander | 703/28 |
| 5,574,892 | * | 11/1996 | Christensen | 703/28 |
| 5,630,102 | * | 5/1997 | Johnson | 703/28 |
| 5,640,542 | * | 6/1997 | Whitsel | 703/28 |
| 5,875,153 | * | 2/1999 | Hii | 365/233 |
| 5,951,696 | * | 9/1999 | Naaseh | 714/34 |
| 5,956,477 | * | 9/1999 | Ranson | 714/30 |
| 5,982,681 | * | 11/1999 | Schwarz | 365/201 |
| 6,003,142 | * | 12/1999 | Mori | 714/30 |
| 6,119,254 | * | 9/2000 | Assouad | 714/724 |
| 6,085,346 | * | 7/2001 | Lepejian | 714/733 |
| 6,314,530 | * | 11/2001 | Mann | 714/38 |

FOREIGN PATENT DOCUMENTS

JP    8-161191    6/1996

* cited by examiner

*Primary Examiner*—Robert Beausoleil
*Assistant Examiner*—Bryce P. Bonzo
(74) *Attorney, Agent, or Firm*—Burns, Doane, Swecker & Mathis, LLP

(57) ABSTRACT

A debug circuit (2) and a microcomputer incorporating the debug circuit (2). The debug circuit (2) is capable of receiving a trace event from a functional block A as long as a CPU (5) does not generate any trace event, and capable of receiving the trace event from the functional block A in synchronization with a standard clock signal CLK used in the CPU (5) when the reception of the trace event from the functional block A is permitted.

18 Claims, 12 Drawing Sheets

DEBUG CIRCUIT AND MICROCOMPUTER INCORPORATING DEBUG CIRCUIT

BACKGROUND OF THE INVENTION

1. Field of the Invention

The present invention relates to a debug circuit for debugging programs and a microcomputer incorporating the debug circuit.

2. Description of the Related Art

Conventionally, an in-circuit emulator (hereinafter referred to as ICE) are commonly used for debugging programs stored in a microprocessor during program development.

The function of the ICE is to emulate the function of a microprocessor performing a program debug operation. Address and data buses in the microcomputer are connected to a memory in the ICE. The debugging program is down loaded from a host computer to the memory in the ICE. Then, the ICE controls the operation of the microcomputer for the debugging of the program.

Normally, the address and data buses to be connected to the memory in the ICE are not connected to terminals in the LSI because programs are stored in the memory in the microcomputer having a microcontroller incorporated in the LSI. For this reason, it must be required to enter a dedicated operation mode for ICE connection where the address and data buses are connected to the external terminals of the LSI, and the inherent function of the terminals to be used for the address and data buses are emulated in the ICE.

However, because it must be required to use the total number of terminals in the microcomputer for connecting the ICE to the microcomputer as a target system for debugging, it becomes difficult to connect the ICE to the target system according to the increasing of the operation speed of the microcomputer and the increasing of the number of bits per bus. It becomes difficult to emulate the inherent function of terminals to be used for address and data buses, which connect the ICE to the memory, by using the ICE, because various functional devices in addition to the microcontroller of the microcomputer are incorporated in a system LSI in order to form the function of the system LSI.

Based on the background of the conventional ICE described above, the debug circuit 102 to compensate a part of the function of the conventional ICE is incorporated in the microcomputer. Thereby, it is widely used to perform a program-development method in which the debug circuit is connected to the host computer (not shown) through dedicated terminals only for debugging in the LSI.

FIG. 1 is a diagram showing the entire configuration of a LSI incorporating a conventional debug circuit. In FIG. 1, the reference number 100 designates a microcomputer, and 102 denotes a debug circuit incorporated in the microcomputer 100. The debug circuit 102 is connected to an external debugger (omitted from FIG. 1) through both a data terminal (DATA terminal) of a plurality of bit lines, a clock terminal (CK terminal) for synchronizing data transfer with a clock signal, and a OE terminal for controlling input/output operation of the data and clock signal. The data transfer operation is performed between the debug circuit 102 and the external debugger (not shown) through the DATA terminal of a plurality of bit lines.

The reference number 103 designates a functional block group having a functional block A and a functional block B incorporated in the LSI. The functional block A is directly connected to a control bus, an address bus, and a data bus in the microcomputer 100. Each of the control bus, the address bus, and the data bus has a plurality of bit lines. The functional block B is independently separated in configuration from the microcomputer 100.

The reference number 104 indicates a bus interface, 105 designates a central processing unit (CPU), 106 denotes a memory, 107 designates a down load circuit, 108 indicates a register control circuit, 109 designates a trace control circuit, 110 denotes a comparator, and 111 indicates a register circuit having a plurality of registers 0 to 3.

The description will be given of the operation of the conventional debug circuit incorporated in the microcomputer 100 on the LSI shown in FIG. 1.

First, the functions (a) to (d) of the debug circuit 102 incorporated in the microcomputer 100 shown in FIG. 1 will be explained.

(a) Communication function between the debug circuit 102 and the external debugger (not shown).

A host computer (omitted from FIG. 1) performs data input/output operation between the host computer and the debug circuit 102 through the external debugger through the CK terminal, the DATA terminal, and the OE terminal. The data transferred from the host computer are input to the debug circuit 102 and then the register control circuit 108 in the debug circuit 102 decodes the data transferred from the host computer and then transfers decoded data to both the down load circuit 107, the trace control circuit 107, the comparator 110, and the register circuit 111 (registers 0 to 3).

(b) Down load function

When programs (as data) generated by the host computer are transferred to the down load control circuit 107 based on the communication function (a) described above, the down load control circuit 107 down loads the programs into the memory 106 through the control bus, the address bus, and the data bus.

(c) Tracing function

The trace control circuit 109 receives control signals indicating the operation state of the CPU 105 through the control bus, the address bus, and the data bus that connect the bus interface 104 to the CPU 105. The trace control circuit 109 then outputs the control signals indicating the operational state of the CPU 105 to the external debugger (not shown) through the CK terminal, the DATA terminal, and the OE terminal.

(d) Break function

Execution addresses and data of program designated by the host computer are written into the comparator 110 through the external debugger in advance. For example, the comparator 105 outputs an interrupt request to the CPU 105 when the operational state of the CPU 105 is changed and when data on the address bus become equal to data that have been pre-stored therein. After this, the interrupt processing program that has been down loaded into the memory 106 in advance is executed so that the data transfer is performed between the CPU 105 and the external debugger through the register circuit 111.

According to the functions (a) to (d) of the debug circuit 102 described above, the program debug operation will be executed based on the following manners (1) to (4):

(1) The host computer generates a program.

(2) The program stored in the microcomputer 100 is down loaded into the memory 106.

(3) Under the instruction generated by and transferred from the host computer, the operational state of the CPU 105 is observed based on the tracing function (c) by the debug circuit 102 that outputs the results of the tracing operation (c).

(4) The break interrupt is generated at the program address indicated by the host computer. Then, in order to obtain the operational state of the CPU 105, the data communication is performed between the host computer and the debug circuit 102 during the interrupt operation.

Although it is possible to obtain the operational state of the CPU 105 because the conventional debug circuit 102 has the configuration and functions described above, it is difficult to observe the operational state of the CPU 105 by using the tracing function (c) of the debug circuit 102 when the operation of the functional block B becomes more complicated along with the increasing of function of the LSI. This causes to decrease the efficiency of the debug operation for programs.

SUMMARY OF THE INVENTION

Accordingly, an object of the present invention is, with due consideration to the drawbacks of the conventional technique, to provide a debug circuit capable of debugging programs efficiently and a microcomputer incorporating the debug circuit.

In accordance with a preferred embodiment of the present invention, a debug circuit receives trace data from a CPU incorporated in a LSI in synchronization with a standard clock signal used in the CPU when the CPU generates a trace event. This debug circuit has a means for receiving a trace event generated by a functional block incorporated in the LSI only when the CPU does not generate any trace event, and for obtaining trace data from the functional block in synchronization with the standard clock signal used in the CPU when the debug circuit receives the trace event from the functional block.

The debug circuit described above as another preferred embodiment, further includes a comparison means for comparing the trace data transferred from the functional block with set data that have been set in advance, and for generating an interrupt request when both the data are equal to each other, and for outputting the interrupt request to the CPU.

In accordance with another preferred embodiment of the present invention, a debug circuit receives trace data from a CPU incorporated in a LSI in synchronization with a standard clock signal used in the CPU when the CPU generates a trace event. This debug circuit has a means for alternately receiving a trace event generated by a functional block incorporated in the LSI and a trace event generated by the CPU, and for obtaining trace data transferred from the functional block in synchronization with the standard clock signal used in the CPU when the debug circuit receives the trace event from the functional block.

The debug circuit described above as another preferred embodiment, further includes a comparison means for comparing the trace data transferred from the functional block with set data that have been set in advance, and for generating an interrupt request when both the data are equal to each other, and for outputting the interrupt request to the CPU.

In accordance with another preferred embodiment of the present invention, a debug circuit receives trace data from a CPU incorporated in a LSI in synchronization with a standard clock signal used in the CPU when the CPU generates a trace event. This debug circuit has a means for periodically receiving a trace event in time generated by a functional block incorporated in the LSI, and for obtaining trace data transferred from the functional block in synchronization with the standard clock signal used in the CPU when the debug circuit receives the trace event from the functional block.

The debug circuit described above as another preferred embodiment, further includes a comparison means for comparing the trace data transferred from the functional block with set data that have been set in advance, and for generating an interrupt request when both the data are equal to each other, and for outputting the interrupt request to the CPU.

The debug circuit described above as another preferred embodiment, further comprises an access means for directly receiving program codes transferred from the functional block when the CPU gets the program codes from the functional block.

In accordance with another preferred embodiment of the present invention, a microcontroller incorporated in a LSI has each of the debug circuits described above and circuit components. The circuit components are a memory circuit, a timer circuit for periodically generating a timer overflow signal and transferring the timer overflow signal to a functional block incorporated in the LSI, and an interrupt circuit for performing an interrupt operation when receiving an interrupt request generated by and transferred from the functional block based on receiving of the timer overflow signal. In addition, the functional block directly accesses the circuit components in the microcomputer by generating the interrupt request based on the receiving of the timer overflow signal and by transferring the interrupt request to the interrupt circuit.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 1:
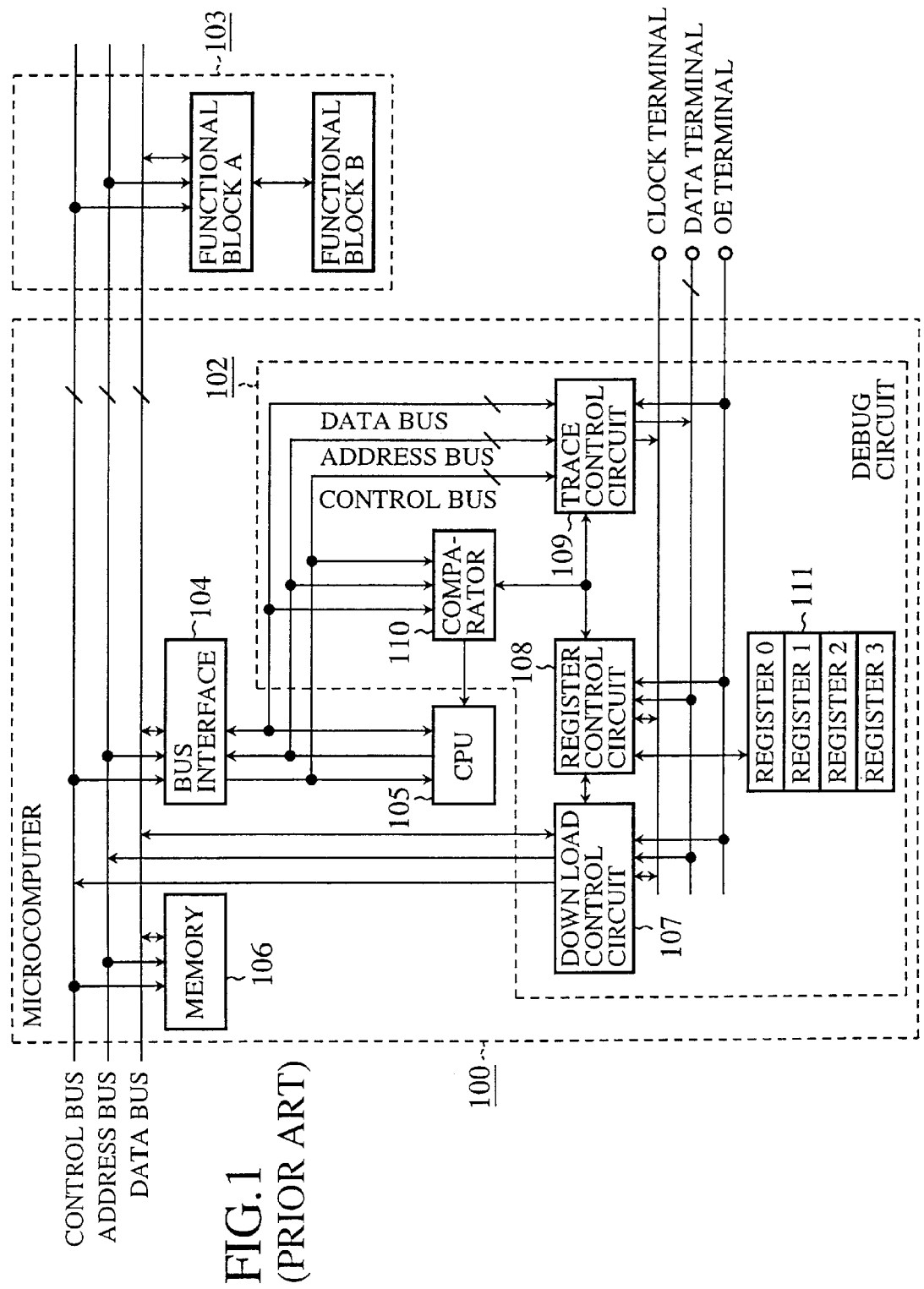
FIG. 1 is a diagram showing the entire configuration of a LSI incorporating a conventional debug circuit.
Figure 2:
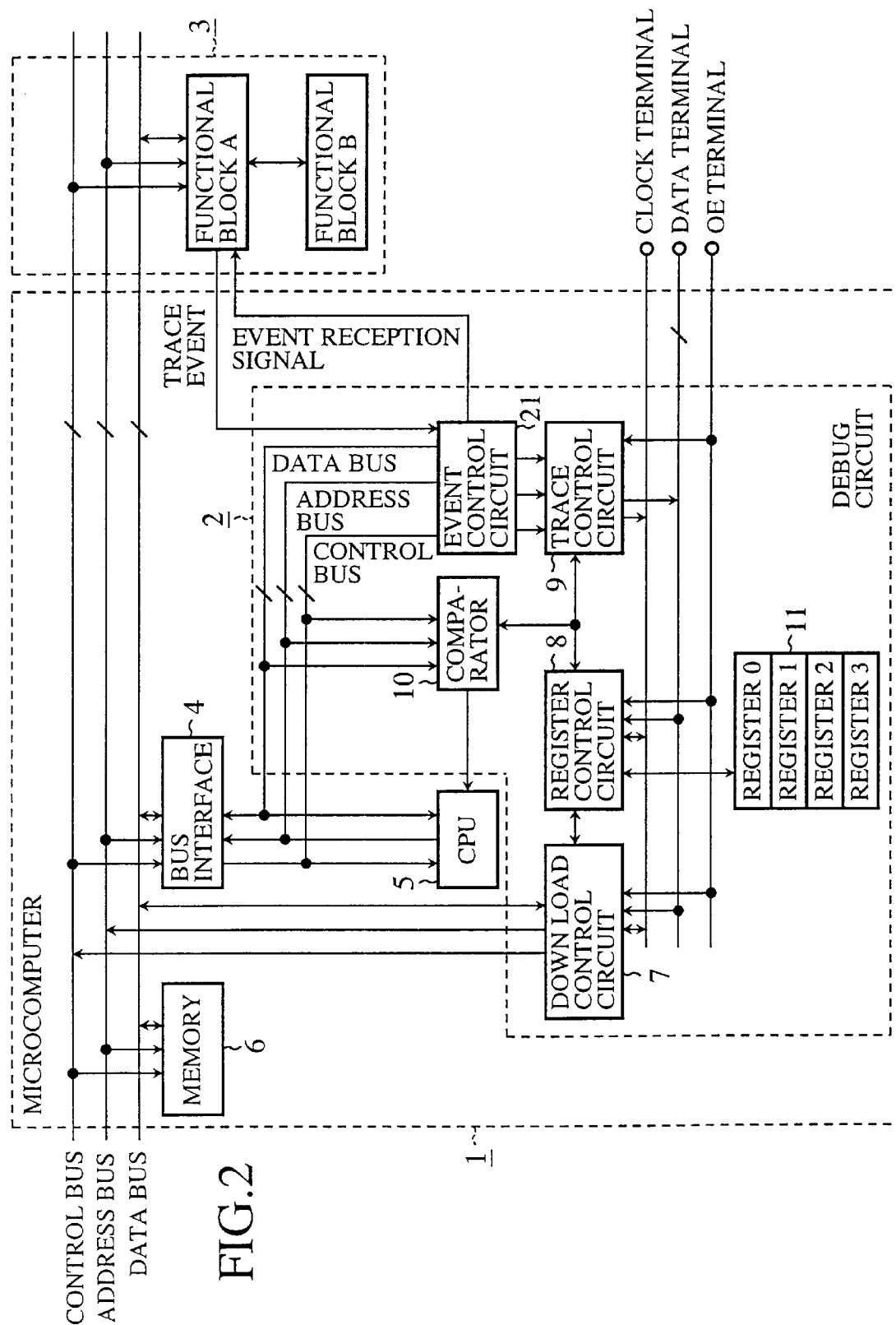
FIG. 2 is a diagram showing a configuration of a LSI incorporating a debug circuit as the first embodiment according to the present invention.

FIG. 2 is a diagram showing a configuration of a LSI incorporating a debug circuit as the first embodiment according to the present invention. In FIG. 2, the reference number 1 designates a microcomputer, and the reference number 2 denotes a debug circuit incorporated in the microcomputer 1. The debug circuit 2 is connected to an external debugger (omitted from FIG. 2) through both a data terminal (DATA terminal) of a plurality of bit lines, a clock terminal (CK terminal) for synchronizing data transfer with a clock signal, and a OE terminal for controlling input/output operation of the data and the clock signal. The data transfer operation is performed between the debug circuit 2 and the external debugger (not shown) through the DATA terminal of a plurality of bit lines.

The reference number 3 designates a functional block group having a functional block A and a functional block B incorporated in the LSI. The functional block A is directly connected to a control bus, an address bus, and a data bus in the microcomputer 1. Each of the control bus, the address bus, and the data bus has a plurality of bit lines. The functional block B is independently separated in configuration from the microcomputer 1. The reference number 4 indicates a bus interface, the reference number 5 designates a central processing unit (CPU), the reference number 6 denotes a memory, the reference number 7 designates a down load circuit, the reference number 8 indicates a register control circuit, the reference number 9 designates a trace control circuit, and the reference number 10 denotes a comparator. The reference number 11 indicates a register circuit having a plurality of registers 0 to 3. The reference number 21 indicates an event control circuit for receiving a trace event generated by and transferred from the functional block 3 only if the CPU 5 does not generate any trace event when the functional block in the functional block group 3 generates the trace event. In addition, the event control circuit 21 gets trace data from the functional block in the functional block group 3 in synchronization with a standard clock signal CLK of the CPU 5 when receiving the trace event from the functional block in the functional block group 3.

Figure 3:
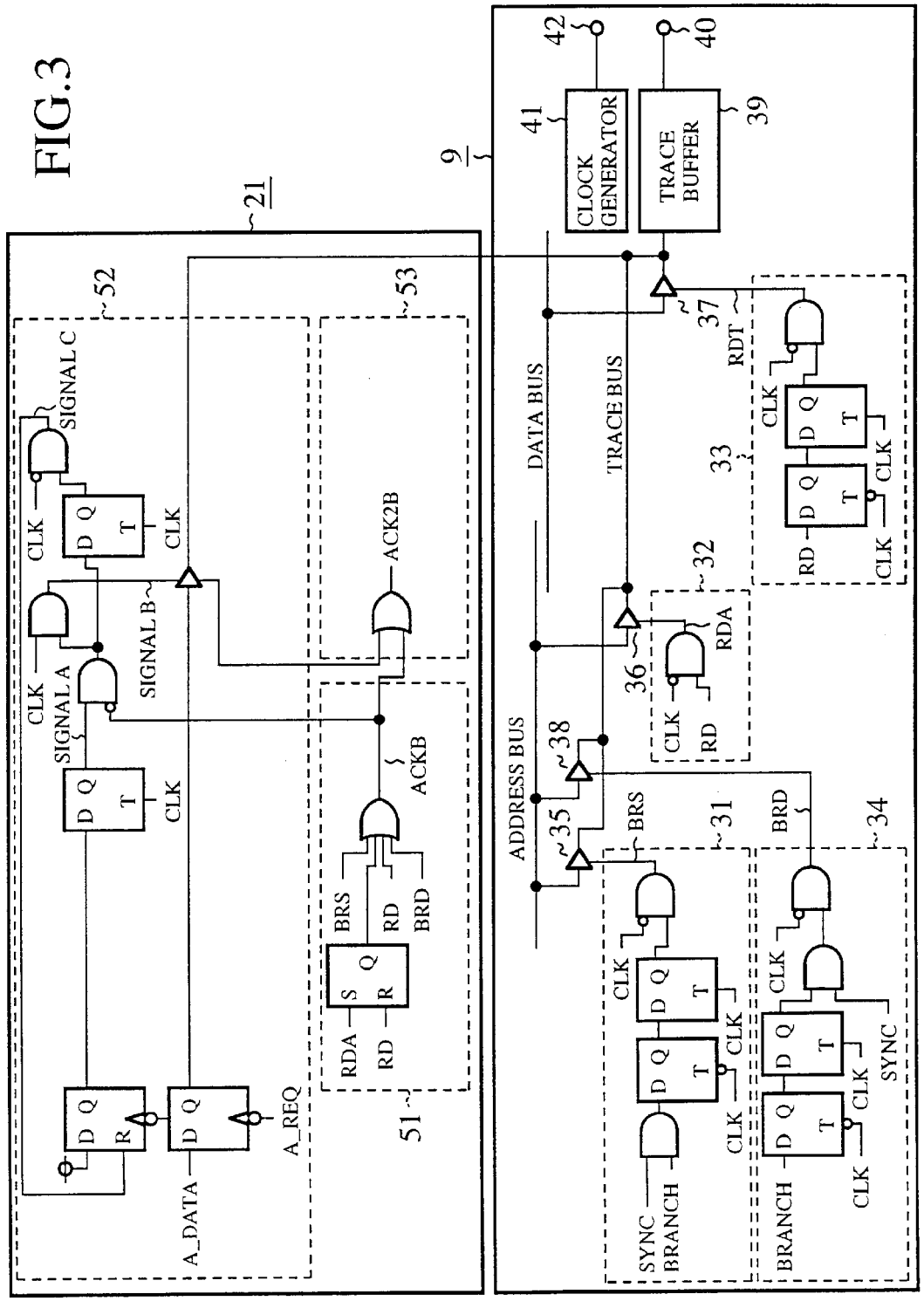
FIG. 3 is a diagram showing a configuration of a trace control circuit and an event control circuit in the debug circuit shown in FIG. 2.

FIG. 3 is a diagram showing a detailed configuration of the trace control circuit 9 and the event control circuit 21 in the debug circuit 2 shown in FIG. 2. In FIG. 3, the reference number 31 designates an address event generation circuit for generating an address event of a branch source. The reference number 32 denotes an address event generation circuit for generating an address event during memory access operation. The reference number 33 indicates a data event generation circuit for generating a data event during the memory access operation. The reference number 34 designates an address event generation circuit for generating an address event of a branch target. The reference numbers 35 to 38 denote tri-state buffers, the reference number 40 indicates an output terminal, 41 designates a clock generation circuit, and 42 indicates an output terminal. The reference number 51 designates a notification circuit for outputting an acknowledge signal ACKB informing the generation of a trace event from the CPU 5 when the CPU 5 generates the trace event. The reference number 52 designates a synchronous circuit for synchronizing the trace event with the standard clock signal CLK of the CPU 5. The reference number 53 denotes a logical OR (logical sum) circuit.

The description will be given of the operation of the debug circuit 2 according to the first embodiment.

Figure 4:
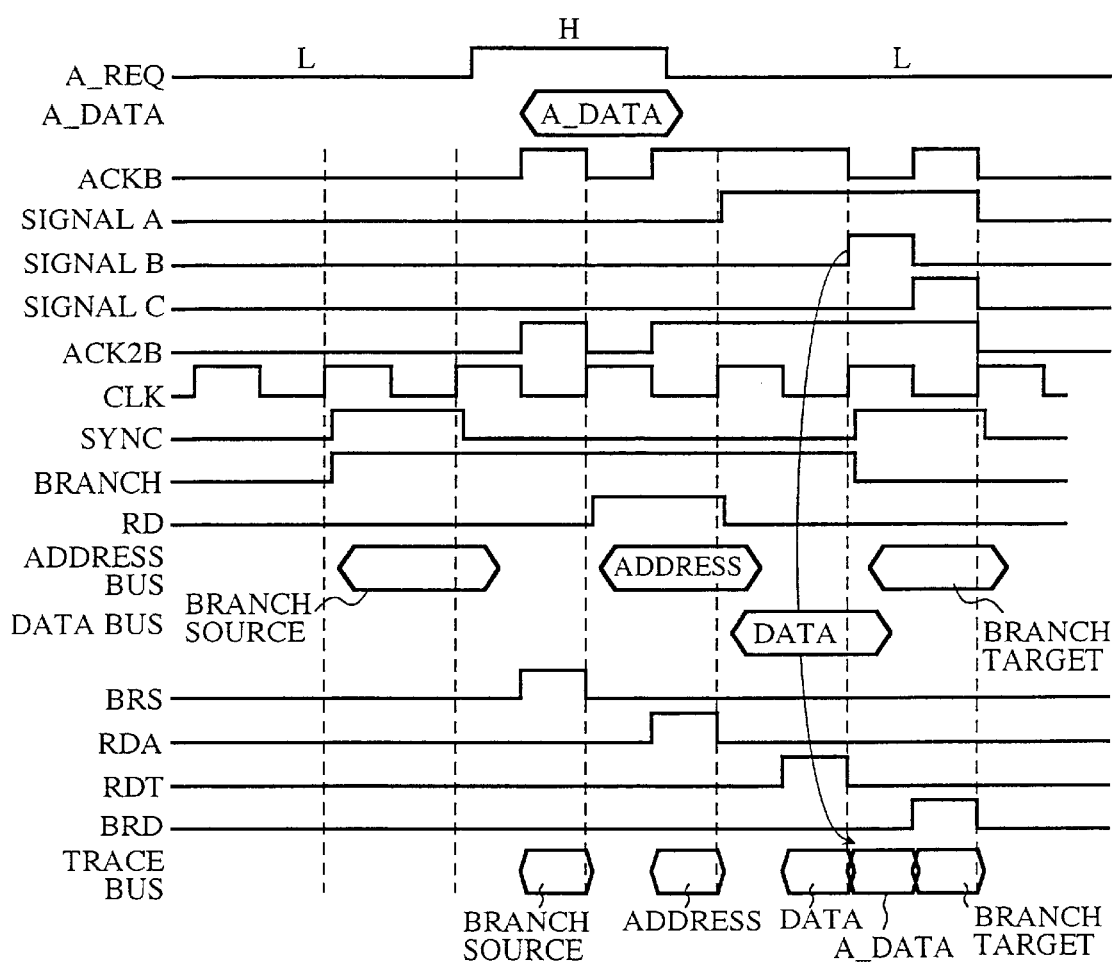
FIG. 4 is a timing chart showing the operation of the debug circuit as the first embodiment shown in FIG. 2.

FIG. 4 is a timing chart showing the operation of the debug circuit 2 as the first embodiment shown in FIG. 2.

First, it is explained that the CPU 5 generates a trace event. For example, when a condition branch instruction is executed, the level of a control signal SYNC becomes a high level (or a H level). This control signal SYNC is generated per instruction execution by a microcomputer. In addition, the condition branch instruction is an instruction to execute a branch operation when the value read from a memory indicates a true value in logical.

In this case above, the CPU 5 outputs a branch signal BRANCH. The address event generation circuit 31 thereby outputs an address event signal BRS for a branch source while the standard clock signal CLK is a low level (or a L level).

The address event generation circuit 32 outputs an address event signal RDA while the standard clock signal CLK of the CPU 5 is the L level and the data event generation circuit 33 outputs a data event signal RDT during the following L level of the standard clock signal CLK when the CPU 5 outputs a memory access signal RD.

At the completion of the execution of the condition branch instruction, the address event generation circuit 34 outputs an address event signal BRD for a branch target based on the control signal SYNC for the following instruction to be executed later and the branch signal BRANCH.

Because the tri-state buffers 35 to 38 thereby turn ON based on the address event signal BRS, the address event signal RDA, the data event signal RDT, and the address event signal BRD, the data on the address bus and the data bus are transferred to and stored into the trace buffer 39 in the trace control circuit 9.

When the trace data are stored into the trace buffer 39 by using the manner described above, the trace data are output to the external debugger (not shown) through the output terminal 40 (see FIG. 3) and the DATA terminal (see FIG. 2) in synchronization with a clock signal generated by a clock generation circuit 41.

The description will be given of the case to generate a trace event by the functional block A in the functional block group 3.

First, when the functional block A in the functional block group 3 outputs an event signal A_REQ and a trace data A_DATA, the synchronization circuit 52 in the event control circuit 21 basically latches the trace data A_DATA at the falling edge of the event signal A_REQ, and then outputs the trace data A_DATA to the trace bus in synchronization with the standard clock signal CLK of the CPU 5. In this case, because the synchronization circuit 52 preferentially processes the trace event generated by the CPU 5, the synchronization circuit 52 halts the output of the trace data A_DATA from the functional block A to the trace bus when receiving a notice signal ACKB informing the generation of the trace event by the CPU 5.

When the trace data A_DATA is output on the trace bus, the trace data A_DATA is stored into the trace buffer 39 like the case of the generation of the trace event by the CPU 5 and then output to the external debugger (not shown) through the output terminal 40 in the trace control circuit 9 and the data terminal in synchronization with the clock signal generated by the clock generator 41.

As described above, according to the first embodiment of the present invention, the debug circuit has the configuration in which when the functional block A generates a trace event, the event control circuit 21 receives a trace event generated by and transferred from the functional block A only if the CPU 5 does not generate any trace event when the functional block A generates this trace event and the event control circuit 21 then gets trace data from the functional block A in synchronization with the standard clock signal CLK of the CPU 5 when receiving the trace event from the functional block A. It is thereby possible to trace the operation of the functional block A. This causes to increase the efficiency of the debug operation for programs of the microcomputer 1 incorporated in the LSI.

In the example of the first embodiment described above, the control operation to the trace event output from the functional block A has been described. However, the present invention is not limited by this example, for example, it is also possible to trace a trace event output from the functional block B in the functional block group 3 by incorporating an additional logical OR circuit 53 in the event control circuit 21 for the functional block B in order to generate a signal ACK2B that is generated by performing a logical OR operation between a signal B (as an event reception signal) and an event signal ACKB from the CPU 5 and by synchronizing the trace event from the functional block B with the standard clock signal CLK of the CPU 5. It is thereby possible to perform the trace output for both the functional blocks A and B as a plurality of functional blocks.

Second Embodiment

In the explanation of the first embodiment described above, it has been described that the event control circuit 21 receives the trace event from the functional block in the functional block group 3 only when the CPU 5 does not generate any trace event. It is also acceptable for the event control circuit 21 to alternately receive trace events from both the functional block in the functional block group 3 and the CPU 5.

Figure 5:
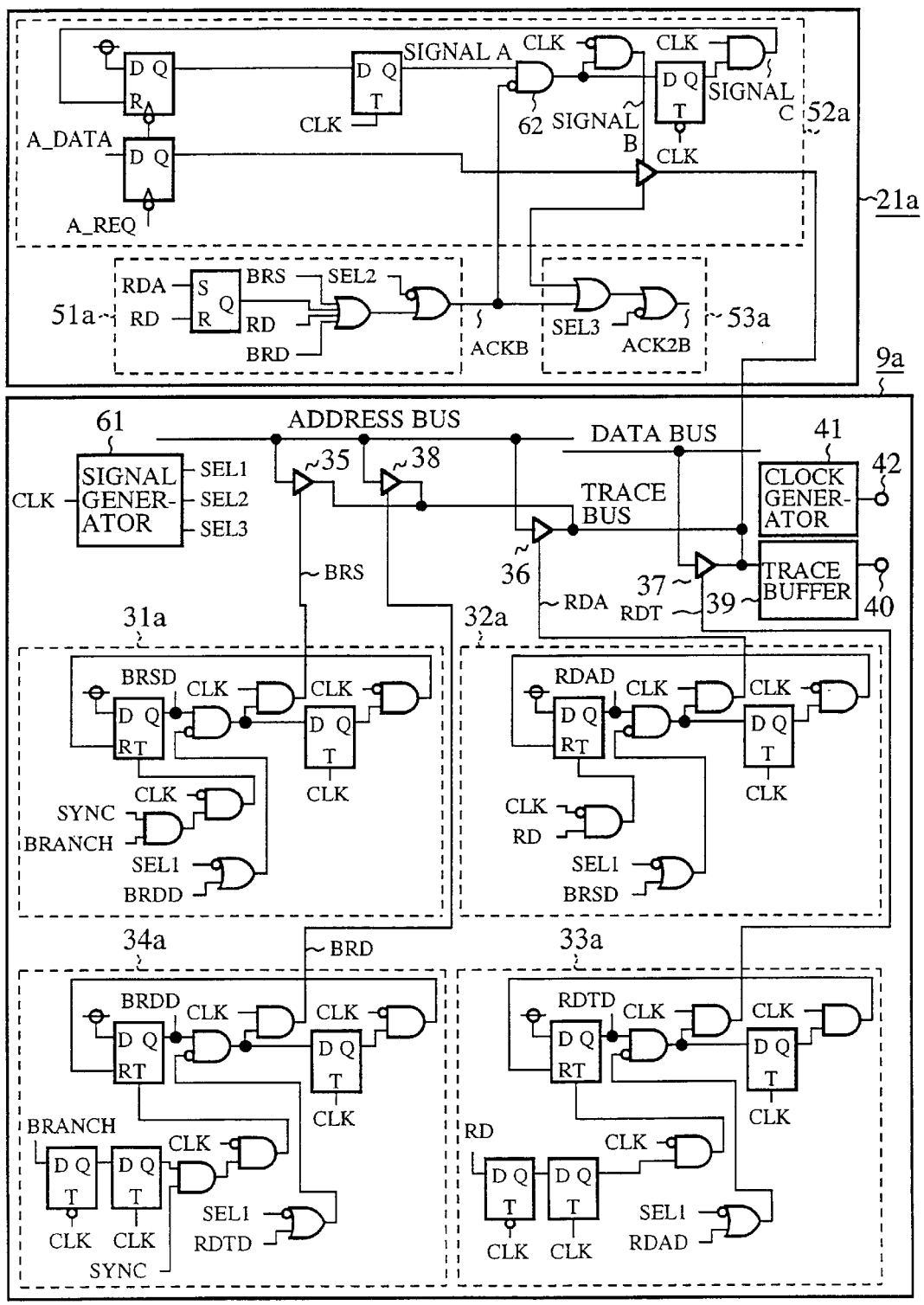
FIG. 5 is a diagram showing a configuration of a trace control circuit and an event control circuit in the debug circuit according to the second embodiment of the present invention.

FIG. 5 is a diagram showing the configuration of the trace control circuit and the event control circuit in the debug circuit according to the second embodiment of the present invention. In FIG. 5, the reference character 21a designates the event control circuit, and 9a denotes the trace control circuit. Other components are the same as those of the first embodiment shown in FIGS. 2 and 4. The explanation of the same components is therefore omitted here for brevity.

The description will be given of the operation of the debug circuit according to the second embodiment.

Figure 6:
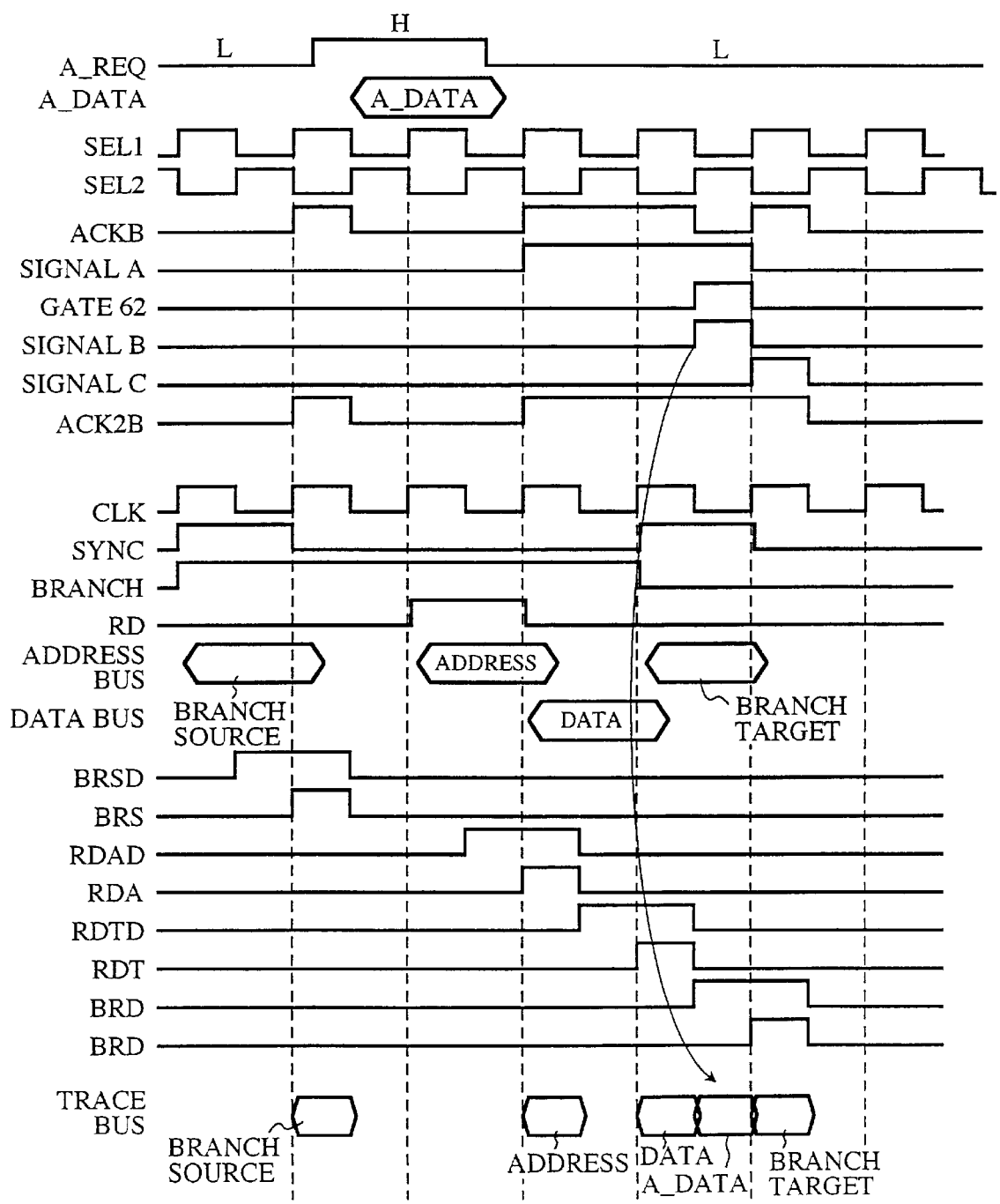
FIG. 6 is a timing chart showing the operation of the debug circuit as the second embodiment shown in FIG. 5.

FIG. 6 is a timing chart showing the operation of the debug circuit as the second embodiment shown in FIG. 5. Although the signal generator 61 generates control signals SEL1 and SEL2 that are different in phase by 90 degree to each other shown in FIG. 6, the writing for a trace event output from the CPU 5 to the trace buffer 39 is permitted only when the control signal SEL1 is the H level.

For example, the output of the address of a branch source to the trace bus will be explained. A control signal BRSD is output only when both the control signals SYNC and BRANCH are the H level. The control signal BRSD is permitted only when the control signal SEL1 is the H level and the control signal BRDD is the L level. The BRS signal becomes the H level while the standard clock signal CLK is the H level. This enters the tri-state buffer 35 into the ON state. This causes to output the address of the branch source to the trace bus.

The control signal BRDD continues the H level when the event of the branch target caused before the trace event of the address of the branch source is generated is output to the trace bus. This control signal BRDD is used for sequentially outputting the trace events in generation order to the trace bus.

Next, the output of the following address event to the trace bus during the memory accessing will be explained.

The control signal RDAD becomes the H level when the standard clock signal CLK is the L level and the memory access signal RD is the H level. This control signal RDAD of the H level then causes to output the RDA signal to the tri-state buffer 36 in order to enter this tri-state buffer 36 into the ON state during the H level of the standard clock signal CLK after the event control circuit 21a receives the trace event of the address of the branch source (during the L level of the control signal BRSD). Thereby, the address event during the memory accessing is output to the trace bus.

Similarly, the data event generated during the memory accessing is output to the trace bus based on the RTD signal while the signal SEL1 is the H level.

Furthermore, the address event of the branch target generated is output to the trace bus based on the BRD signal (during the L level of the control signal RDTD) while the signal SEL1 is the H level and after the data event of the memory accessing is completed.

On the other hand, about the trace event from the functional block A, the notice signal ACKB becomes the L level when there is no event from the CPU 5 and the control signal SEL2 becomes the H level. This causes that the event control circuit 21a receives the trace event from the functional block A. Accordingly, by using both the control signals SEL1 and SEL2, it is possible to output the trace events from both the CPU 5 and the functional block A alternately. The trace control circuit 9a can output the trace events through the trace buffer 39 to the external debugger (not shown).

As described above, according to the second embodiment of the present invention, the debug circuit has the configuration in which the event control circuit in the debug circuit alternately receives the trace events from both the CPU 5 and the functional block A when the functional block A generates the trace event, and the debug circuit 9a inputs the trace data transferred from the functional block A in synchronization with the standard clock signal CLK of the CPU 5 when receiving the trace event from the functional block A. It is therefore possible to preciously output the operational order of the functional block A to the CPU 5. This causes to increase the efficiency of the debug operation for programs of the microcomputer 1 incorporated in the LSI.

In the example of the second embodiment described above, the control operation of the trace event output from the functional block A has been described. However, the present invention is not limited by this example, for example, it is also possible to generate a trace event acknowledge signal ACK2B for the functional block B in the functional block group 3 by generating a control signal SLE3 from the signal generation circuit 61. It is thereby possible to perform the trace output from both the functional blocks A and B as a plurality of functional blocks in the functional block group 3 according to the order of the generation.

Third Embodiment

Figure 7:
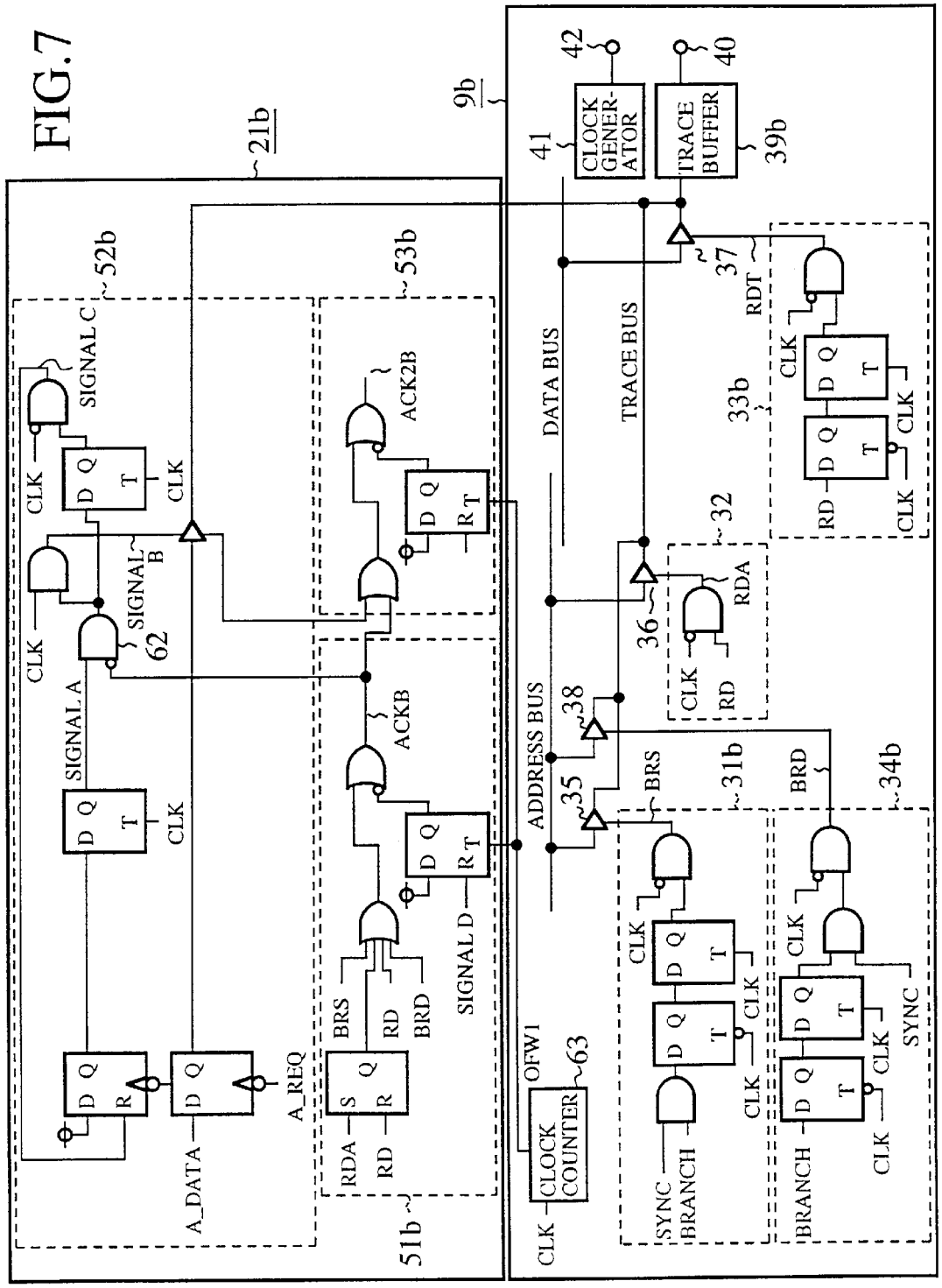
FIG. 7 is a diagram showing a configuration of a trace control circuit and an event control circuit in the debug circuit according to the third embodiment of the present invention.

FIG. 7 is a diagram showing a configuration of the trace control circuit 9b and the event control circuit 21b in the debug circuit according to the third embodiment of the present invention. In FIG. 7, the reference number 63 designates a clock counter for periodically generating an overflow signal OFW1, the reference number 21b denotes an event control circuit, and the reference number 9b indicates a trace control circuit. Other components are the same as those of the first and second embodiments shown in FIGS. 2 to 6. The explanation of the same components is therefore omitted here for brevity.

As has been described above, the debug circuit of the second embodiment has the feature that the trace events from both the CPU 5 and the functional block group 3 is alternately received by the event control circuit. However, the present invention is not limited by this feature, it is also possible to periodically receive the trace event from the functional block group 3. Because the CPU 5 can directly access registers in the functional block A that can use buses in configuration commonly with the microcomputer 1, it is often possible to perform a complementary checking the operational state of the functional block A during the development of programs. Hence, the tracing to the trace events from the functional block A may be outputted intermittently. This manner can obtain the same effect of the first and second embodiments. In addition, in both the first and second embodiments shown in FIG. 2 to FIG. 6, because the trace output is performed for both the CPU 5 and a plurality of functional blocks in the functional block group 3, it must be required to have the trace buffer 39 of a large memory size.

Figure 8:
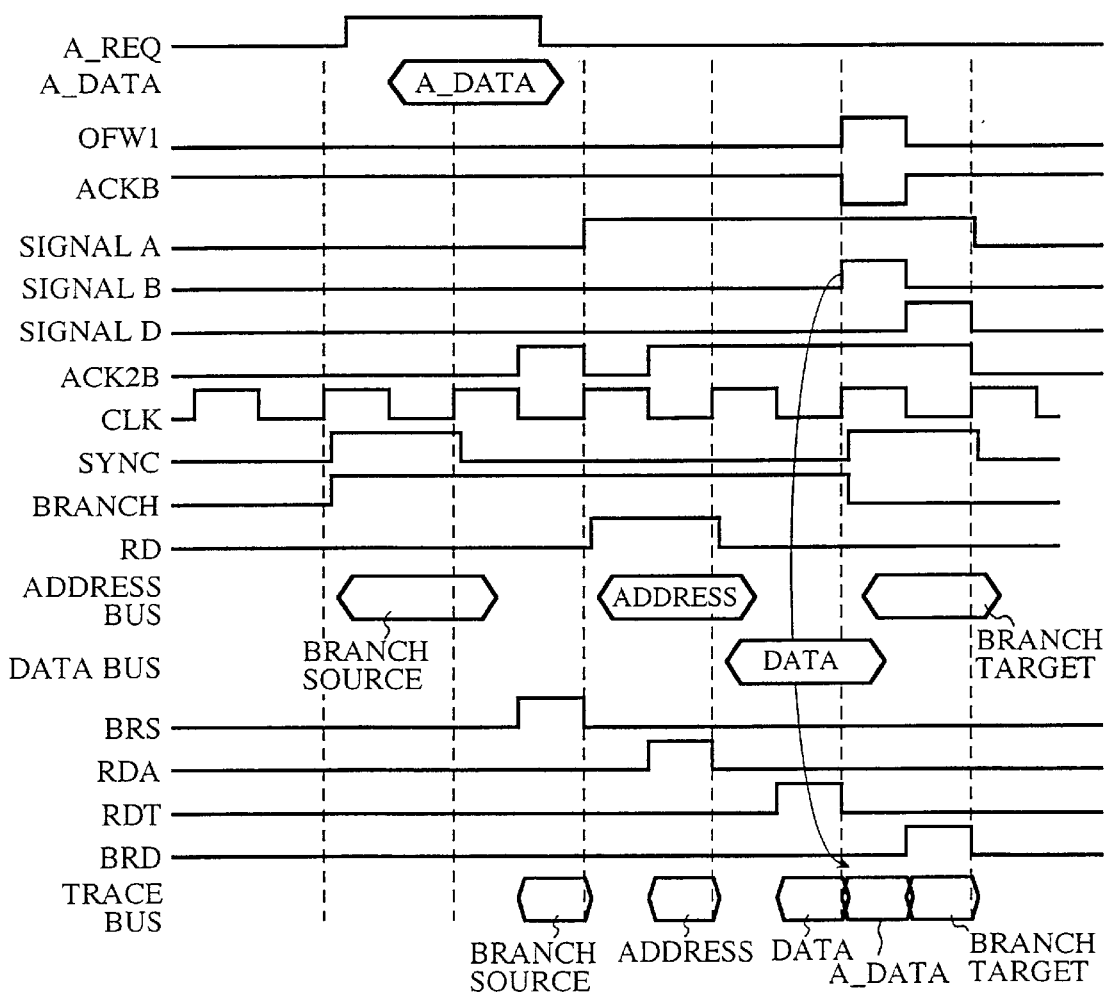
FIG. 8 is a timing chart showing the operation of the debug circuit as the third embodiment shown in FIG. 7.

On the other hand, according to the debug circuit of the third embodiment shown in FIGS. 7 and 8, it is possible to decrease the memory size of the trace buffer 39 because the trace events are output intermittently.

The description will be given of the operation of the debug circuit of the third embodiment.

FIG. 8 is a timing chart showing the operation of the debug circuit as the third embodiment shown in FIG. 7.

A clock counter 63 is further incorporated in the trace control circuit 9b in the debug circuit of the third embodiment. This clock counter 63 periodically generates an overflow signal OFW1. The notice circuit 51 halts the output of the notice signal ACKB only the period in which the clock counter 63 periodically generates the overflow signal OFW1 shown in FIG. 8. Accordingly, it is possible to intermittently output the trace event from the functional block A to the trace bus and it is thereby possible to intermittently output the trace event to the external debugger through the trace buffer 39b.

As apparently described above, according to the third embodiment of the present invention, the debug circuit has the configuration in which the event control circuit 21b periodically receives trace events, and the trace control circuit 9b receives trace data from the functional block A when receiving the trace event from the functional block A in synchronization with the standard clock signal CLK of the CPU 5.

Since the explanation of the debug circuit of the third embodiment shows the control of the trace event only from the functional block A, it is also possible to intermittently receive trace events from both the functional blocks A and B as a plurality of functional blocks only by adding a logical OR circuit 53b into the event control circuit 21b (see FIG. 7) and by change the notice circuit 51b in configuration for the functional block B.

Fourth Embodiment

As has been described above, in the debug circuits of the first to third embodiments shown in FIG. 2 to FIG. 8, the event control circuit 21, 21a, and 21b receive trace events. However, the present invention is not limited by those configuration of the first to third embodiments. It is also possible to form the microprocessor in configuration in which a comparator generates and directly outputs an interrupt signal to the CPU 5 when the event control circuit receives a trace events from the functional block A and trace data from the functional block A are agree with predetermined data that have been set in the comparator in advance.

Figure 9:
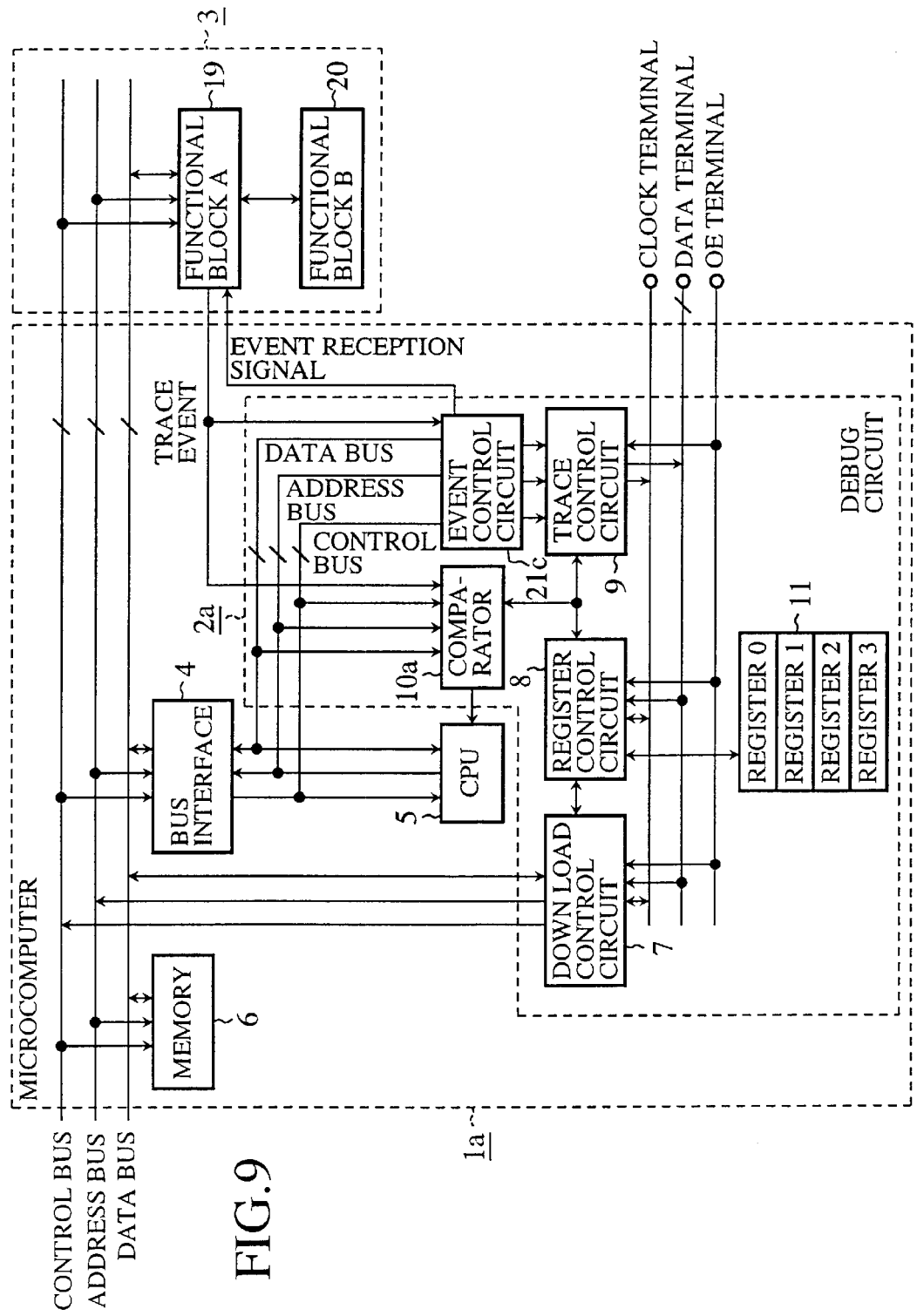
FIG. 9 is a diagram showing a configuration of a LSI incorporating a debug circuit as the fourth embodiment according to the present invention.

FIG. 9 is a diagram showing a configuration of a LSI incorporating the microprocessor 1a having the debug circuit 2a as the fourth embodiment according to the present invention. In FIG. 9, the reference number 10a designates a comparator. The reference character 21c designates the event control circuit such as the event control circuits 21, 21a, 21b in the debug circuits according to the first to third embodiments, and the reference character 10a denotes a comparator. The reference number 2a designates the debug circuit of the fourth embodiment. Other components are the same as those of the debug circuit of the first to third embodiments shown in FIG. 2 to FIG. 8, the explanation therefore is omitted here for brevity.

The description will be given of the operation of the debug circuit as the fourth embodiment.

When the event control circuit 21c in the debug circuit 2a receives the trace event from the functional block A, the comparator 10a compares the trace data from the functional block A with predetermined data that have been set in advance. When the trace data from the functional block A are agree with the predetermined data, the comparator 10a generates and outputs the interrupt signal to the CPU 5. Thereby, it is possible to generate the interrupt request by the functional block A and to directly transfer the interrupt operation to the CPU 5. This causes to easily develop programs of the microcomputer 1a.

Fifth Embodiment

In the debug circuits of the first to fourth embodiments shown in FIG. 2 to FIG. 9, it must be required for the bus interface 4 to obtain program codes from the functional block group 3 under the control of the CPU 5 when the CPU 5 gets the program codes from the functional block group 3.

Figure 10:
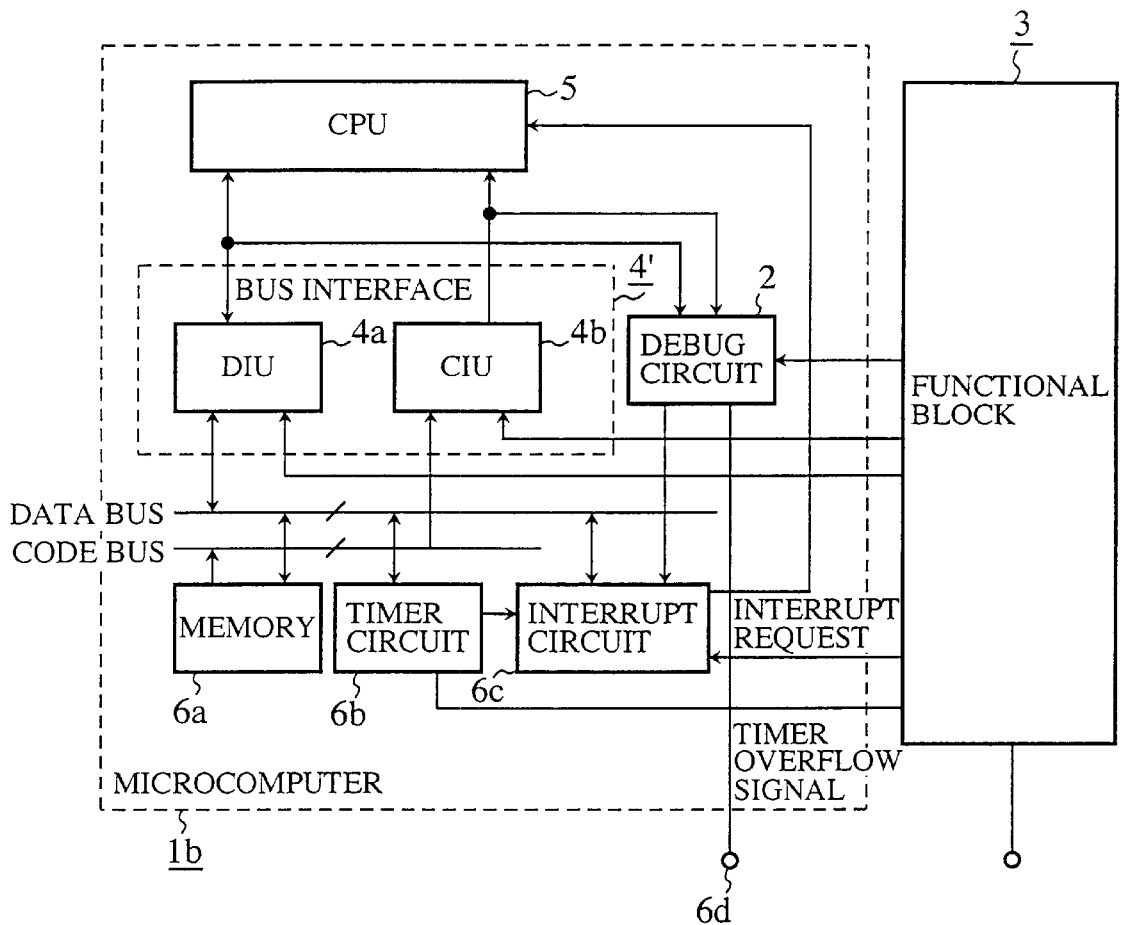
FIG. 10 is a diagram showing a configuration of a LSI incorporating a debug circuit as the fifth embodiment according to the present invention.

FIG. 10 is a diagram showing a configuration of a LSI incorporating a debug circuit as the fifth embodiment according to the present invention. In FIG. 10, the reference number 1b designates a microcomputer. The reference character 4' designates a bus interface circuit, 6a denotes a memory, 6b indicates a timer circuit, 6c designates an interrupt circuit, and 6d denotes an external terminal connected to the debug circuit 2. Those circuits 4', 6a, 6b, and 6c are internal circuit components as circuit resources in the microcomputer 1b. Other components are the same as those of the debug circuit of the first to fourth embodiments shown in FIG. 2 to FIG. 9, the explanation therefore is omitted here for brevity.

The description will be given of the operation of the debug circuit as the fifth embodiment.

The DIU 4a or the CIU 4b in the bus interface circuit 4' directly gets program codes from the functional block group 3 under the control of the CPU 5, not through the data bus and the address bus, when the CPU 5 gets the program codes from the functional block group 3. Further, the DIU 4a or the CIU 4b in the bus interface 4' directly accesses internal circuit components such as the memory circuit 6a, the timer circuit 6b, the interrupt circuit 6c in the microcomputer 1b when the functional block in the functional block group 3 accesses the internal circuit components. It is thereby possible for the CPU 5 to get the program codes at a high speed from the functional block group 3 and also possible for the functional block in the functional block group 3 to access the internal components in the microcomputer 1b.

Figure 11:
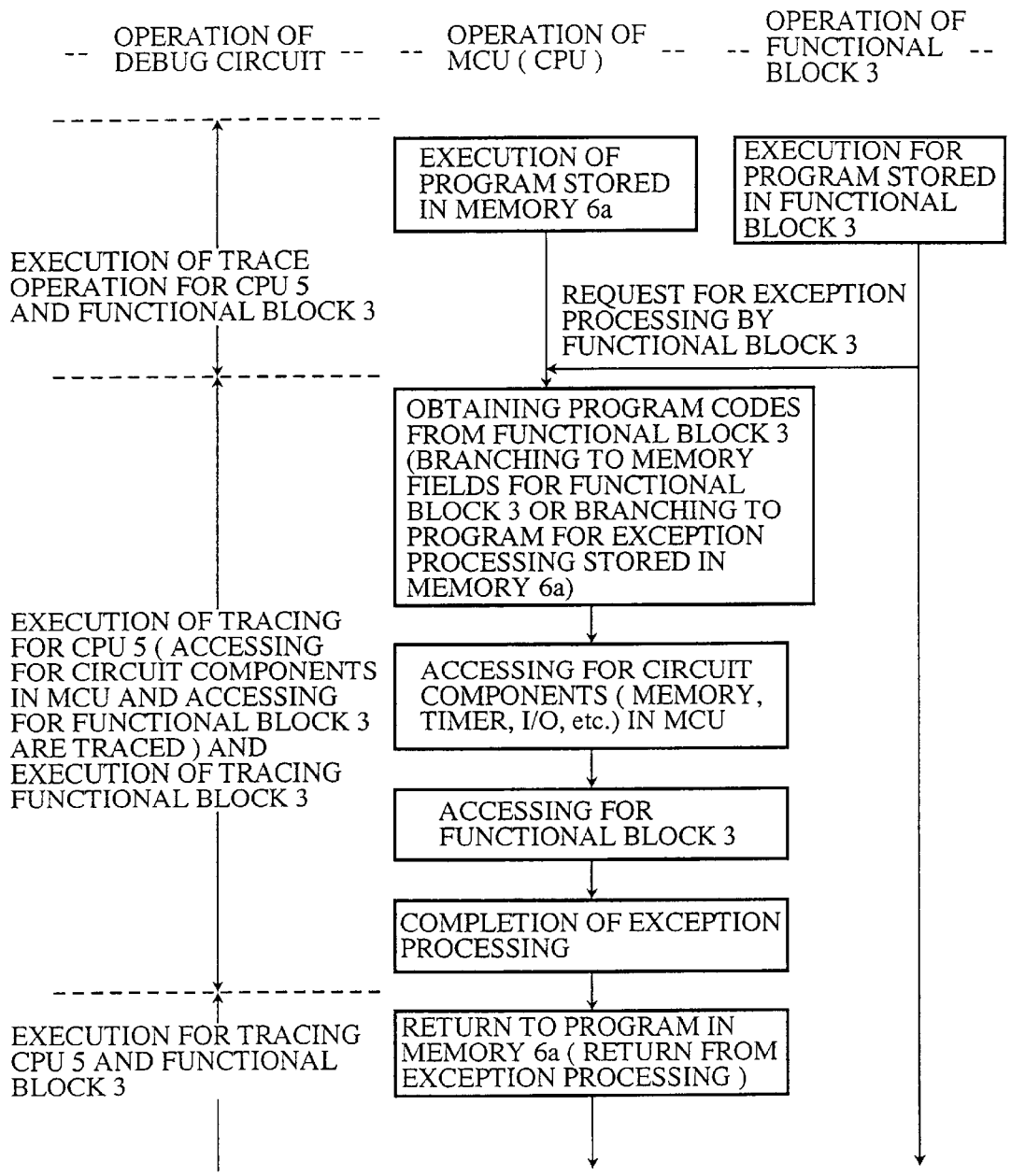
FIG. 11 is a flow chart showing the debugging method of the debug circuit of the fifth embodiment shown in FIG. 10.

FIG. 11 is a flow chart showing the debugging method of the debug circuit of the fifth embodiment shown in FIG. 10.

When each of the debug circuit 2 of the first to fourth embodiments is connected to the CPU 5 and the functional block group 3, the internal components in the microcomputer 1b and the functional block can be accessed during the interrupt process by the CPU 5 by that the functional block in the functional block group 3 periodically generates an interrupt request to the CPU 5 based on the manner shown in FIG. 11. In this case, the access results can be transferred to the external debugger through the external terminal 6d in the debug circuit 2. Thus, because the CPU 5 can monitor the operation state of the internal components in the microcomputer 1b and the functional block group 3 by the tracing, it is possible to increase the efficiency of the program debugging.

Sixth Embodiment

In the debug circuit of the fifth embodiment described above, it has been explained that a functional block in the functional block group 3 generates and transfers an interrupt request to the CPU 5. However, the present invention is not limited by this configuration, for example, it is possible for the CPU 5 to generate an interrupt request and transfer it to the functional block in the functional block group 3 by periodically outputting an overflow signal from the microcomputer 1 to the functional block.

Figure 12:
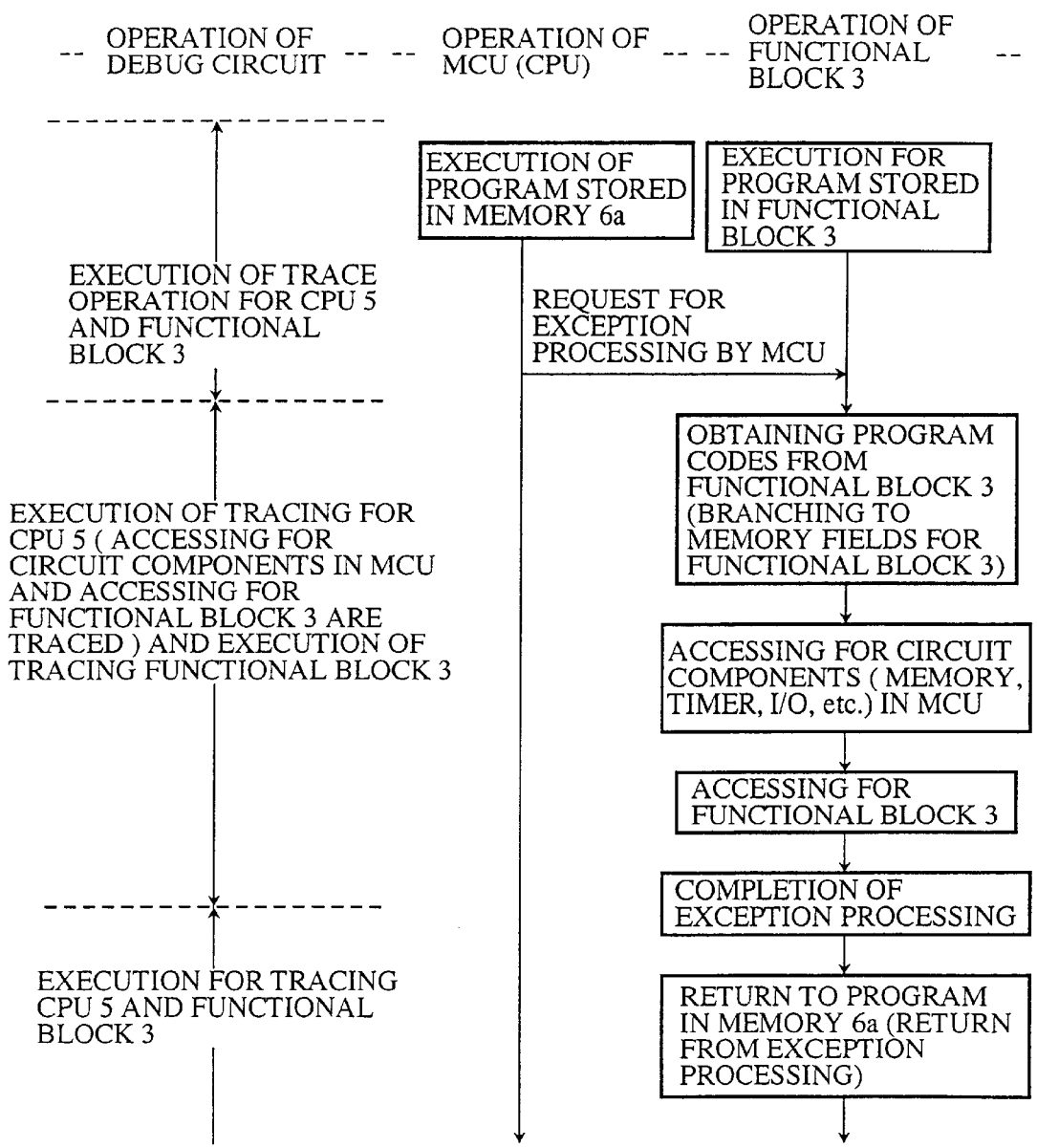
FIG. 12 is a flow chart showing the debugging method of the debug circuit of the sixth embodiment.

FIG. 12 is a flow chart showing the debugging method of the debug circuit as the sixth embodiment.

The functional block group 3 accesses the internal components in the microcomputer 1 and the functional block group 3 after the process enters the interrupt processing. The results of the accessing above may be output through the external terminal 104 in the debug circuit to the external debugger. Because the functional block in the functional block group 3 can monitor the operational state of the internal components in the microcomputer 1 and the functional block group 3 by tracing, it is possible to increase the efficiency of the program debugging.

In addition, the debug circuit as the fifth embodiment performs the debugging method in which the CPU 5 traces the operational states of the internal components in the microcomputer 1 and the functional block group 3. On the other hand, the debug circuit of the sixth embodiment performs the debugging method in which the functional block in the functional block group 3 accesses the operational states of the internal components in the microcomputer 1 and the functional block group 3. Therefore it is possible to select one of the method of the fifth and sixth embodiments according to the condition. That is, the method of the sixth embodiment is used when the process of the trace event from the CPU 5 must be preferentially processed, and the method of the fifth embodiment is used when the process of the trace event from the functional block must be preferentially processed.

As described above in detail, according to the present invention, the debug circuit has the configuration and function in which the debug circuit can receive a trace event generated by a functional block incorporated in a LSI only when the CPU does not generate any trace event, and can obtain trace data from the functional block in synchronization with a standard clock signal used in the CPU when the debug circuit receives the trace event from the functional block. Because it is thereby possible to trace the operation of the functional block, the present invention can provide the effect that it is possible to debug programs efficiently.

In addition, according to the present invention, the debug circuit having the configuration and the function described above further includes a comparison means for comparing the trace data transferred from the functional block with set data that have been set in advance, and for generating an interrupt request when both the data are equal to each other, and for outputting the interrupt request to the CPU. Therefore it is possible for the functional block to generate and transfer the interrupt request to the CPU. This configuration can provide the effect that it is possible to further execute easy development of programs for the microcomputer.

Furthermore, according to the present invention, the debug circuit has the configuration and the function in which the debug circuit can alternately receive a trace event generated by a functional block incorporated in the LSI and a trace event generated by the CPU, and can obtain trace data transferred from the functional block in synchronization with a standard clock signal used in the CPU when the debug circuit receives the trace event from the functional block. Because it is thereby possible to output operation order of the functional block to the CPU preciously, the present invention can provide the effect that it is possible to debug programs efficiently.

Moreover, according to the present invention, the debug circuit having the configuration and the function described above further includes a comparison means for comparing the trace data transferred from the functional block with set data that have been set in advance, and for generating an interrupt request when both the data are equal to each other, and for outputting the interrupt request to the CPU. Therefore it is possible for the functional block to generate and transfer the interrupt request to the CPU. This configuration can provide the effect that it is possible to further execute easy development of programs for the microcomputer.

Furthermore, according to the present invention, the debug circuit has the configuration and the function in which the debug circuit can periodically receive a trace event in time generated by a functional block incorporated in the LSI, and can obtain trace data transferred from the functional block in synchronization with a standard clock signal used in the CPU when the debug circuit receives the trace event from the functional block. Therefore the present invention can provide the effect in which it is possible to trace the operational state of the functional block without increasing the circuit size of the trace circuit and the memory size of the trace buffer.

Moreover, according to the present invention, the debug circuit having the configuration and the function described above further includes a comparison means for comparing the trace data transferred from the functional block with set data that have been set in advance, and for generating an interrupt request when both the data are equal to each other, and for outputting the interrupt request to the CPU. Therefore it is possible for the functional block to generate and transfer the interrupt request to the CPU. This configuration can provide the effect that it is possible to further execute easy development of programs for the microcomputer.

In addition, according to the present invention, the debug circuit having the configuration and the function described above further includes an access means for directly receiving program codes transferred from the functional block when the CPU gets the program codes from the functional block. Therefore the present invention can provide the effect that it is possible to debug programs efficiently.

Furthermore, according to the present invention, a microcontroller incorporated in a LSI has a debug circuit of the present invention and circuit components. The circuit components includes a memory circuit, a timer circuit for periodically generating a timer overflow signal and transferring the timer overflow signal to a functional block incorporated in the LSI, and an interrupt circuit for performing an interrupt operation when receiving an interrupt request generated by and transferred from the functional block based on receiving of the timer overflow signal. In addition, the functional block directly accesses the circuit components in the microcomputer by generating the interrupt request based on the receiving of the timer overflow signal and by transferring the interrupt request to the interrupt circuit. Therefore, the present invention can provide the effect that it is possible to delay programs efficiently.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A debug circuit for receiving trace data from a CPU incorporated in a LSI in synchronization with a standard clock signal used in said CPU when said CPU generates a trace event, comprising:
   means for receiving a trace event generated by a functional block incorporated in said LSI only when said CPU does not generate any trace event, and for obtaining trace data from said functional block in synchronization with said standard clock signal used in said CPU when said debug circuit receives said trace event from said functional block.

2. A debug circuit as claimed in claim 1, further comprises comparison means for comparing said trace data transferred from said functional block with set data that have been set in advance, and for generating an interrupt request when both said data are equal to each other, and for outputting said interrupt request to said CPU.

3. A debug circuit as claimed in claim 2, further comprises access means for directly receiving program codes transferred from said functional block when said CPU gets said program codes from said functional block.

4. A debug circuit as claimed in claim 1, further comprises access means for directly receiving program codes transferred from said functional block when said CPU gets said program codes from said functional block.

5. A debug circuit for receiving trace data from a CPU incorporated in a LSI in synchronization with a standard clock signal used in said CPU when said CPU generates a trace event, comprising:
   means for alternately receiving a trace event generated by a functional block incorporated in said LSI and a trace event generated by said CPU, and for obtaining trace data transferred from said functional block in synchronization with said standard clock signal used in said CPU when said debug circuit receives said trace event from said functional block.

6. A debug circuit as claimed in claim 5, further comprises comparison means for comparing said trace data transferred from said functional block with set data that have been set in advance, and for generating an interrupt request when both said data are equal to each other, and for outputting said interrupt request to said CPU.

7. A debug circuit as claimed in claim 6, further comprises access means for directly receiving program codes transferred from said functional block when said CPU gets said program codes from said functional block.

8. A debug circuit as claimed in claim 5, further comprises access means for directly receiving program codes transferred from said functional block when said CPU gets said program codes from said functional block.

9. A debug circuit for receiving trace data from a CPU incorporated in a LSI in synchronization with a standard clock signal used in said CPU when said CPU generates a trace event, comprising:
   means for periodically receiving a trace event in time generated by a functional block incorporated in said LSI, and for obtaining trace data transferred from said functional block in synchronization with said standard clock signal used in said CPU when said debug circuit receives said trace event from said functional block.

10. A debug circuit as claimed in claim 9, further comprises comparison means for comparing said trace data transferred from said functional block with set data that have been set in advance, and for generating an interrupt request when both said data are equal to each other, and for outputting said interrupt request to said CPU.

11. A debug circuit as claimed in claim 10, further comprises access means for directly receiving program codes transferred from said functional block when said CPU gets said program codes from said functional block.

12. A debug circuit as claimed in claim 9, further comprises access means for directly receiving program codes transferred from said functional block when said CPU gets said program codes from said functional block.

13. A microcontroller incorporated in a LSI comprising:
   a debug circuit as claimed in claim 1; and
   circuit components including
      a memory circuit;
      a timer circuit for periodically generating a timer overflow signal and transferring said timer overflow signal to a functional block incorporated in said LSI; and
      an interrupt circuit for performing an interrupt operation when receiving an interrupt request generated by and transferred from said functional block based on receiving of said timer overflow signal, and
   wherein said functional block directly accesses said circuit components in said microcontroller by generating said interrupt request based on the receiving of said timer overflow signal and by transferring said interrupt request to said interrupt circuit.

14. A microcontroller incorporated in a LSI comprising:
   a debug circuit as claimed in claim 2; and
   circuit components including
      a memory circuit;
      a timer circuit for periodically generating a timer overflow signal and transferring said timer overflow signal to a functional block incorporated in said LSI; and
      an interrupt circuit for performing an interrupt operation when receiving an interrupt request generated by and transferred from said functional block based on receiving of said timer overflow signal, and
   wherein said functional block directly accesses said circuit components in said microcontroller by generating said interrupt request based on the receiving of said timer overflow signal and by transferring said interrupt request to said interrupt circuit.

15. A microcontroller incorporated in a LSI comprising:
a debug circuit as claimed in claim 5; and
circuit components including
- a memory circuit;
- a timer circuit for periodically generating a timer overflow signal and transferring said timer overflow signal to a functional block incorporated in said LSI; and
- an interrupt circuit for performing an interrupt operation when receiving an interrupt request generated by and transferred from said functional block based on receiving of said timer overflow signal, and wherein said functional block directly accesses said circuit components in said microcontroller by generating said interrupt request based on the receiving of said timer overflow signal and by transferring said interrupt request to said interrupt circuit.

16. A microcontroller incorporated in a LSI comprising:
a debug circuit as claimed in claim 6; and
circuit components including
- a memory circuit;
- a timer circuit for periodically generating a timer overflow signal and transferring said timer overflow signal to a functional block incorporated in said LSI; and
- an interrupt circuit for performing an interrupt operation when receiving an interrupt request generated by and transferred from said functional block based on receiving of said timer overflow signal, and wherein said functional block directly accesses said circuit components in said microcontroller by generating said interrupt request based on the receiving of said timer overflow signal and by transferring said interrupt request to said interrupt circuit.

17. A microcontroller incorporated in a LSI comprising:
a debug circuit as claimed in claim 9; and
circuit components including
- a memory circuit;
- a timer circuit for periodically generating a timer overflow signal and transferring said timer overflow signal to a functional block incorporated in said LSI; and
- an interrupt circuit for performing an interrupt operation when receiving an interrupt request generated by and transferred from said functional block based on receiving of said timer overflow signal, and wherein said functional block directly accesses said circuit components in said microcontroller by generating said interrupt request based on the receiving of said timer overflow signal and by transferring said interrupt request to said interrupt circuit.

18. A microcontroller incorporated in a LSI comprising:
a debug circuit as claimed in claim 10; and
circuit components including
- a memory circuit;
- a timer circuit for periodically generating a timer overflow signal and transferring said timer overflow signal to a functional block incorporated in said LSI; and
- an interrupt circuit for performing an interrupt operation when receiving an interrupt request generated by and transferred from said functional block based on receiving of said timer overflow signal, and wherein said functional block directly accesses said circuit components in said microcontroller by generating said interrupt request based on the receiving of said timer overflow signal and by transferring said interrupt request to said interrupt circuit.

* * * * *